(12) United States Patent
Musselman et al.

(10) Patent No.: US 8,853,908 B2
(45) Date of Patent: Oct. 7, 2014

(54) MAGNET ROTOR ASSEMBLY INCLUDING A VACUUM IMPREGNATED BONDED MAGNET HAVING INCREASED CRUSH STRENGTH AT HIGH TEMPERATURES

(75) Inventors: Stanley Byron Musselman, Noblesville, IN (US); Edward E Welker, Carmel, IN (US); Mitchell L Spencer, Carmel, IN (US); Viswanathan Panchanathan, Anderson, IN (US)

(73) Assignee: MBS Engineering, LLC, Carmel, IN (US)

( * ) Notice: Subject to any disclaimer, the term of this patent is extended or adjusted under 35 U.S.C. 154(b) by 66 days.

(21) Appl. No.: 13/035,979

(22) Filed: Feb. 27, 2011

(65) Prior Publication Data

US 2011/0210635 A1   Sep. 1, 2011

Related U.S. Application Data

(60) Provisional application No. 61/308,914, filed on Feb. 27, 2010.

(51) Int. Cl.
*H02K 1/27* (2006.01)
*H02K 1/28* (2006.01)
*H02K 21/12* (2006.01)

(52) U.S. Cl.
CPC ............... *H02K 1/2733* (2013.01); *H02K 1/28* (2013.01)
USPC .................... 310/156.21; 310/45; 310/156.19; 310/156.23

(58) Field of Classification Search
CPC ............ H02K 1/27; H02K 1/28; H02K 21/12
USPC ...................... 310/156.21, 156.19, 156.23, 45

IPC ....................................... H02K 1/27,1/28, 21/12
See application file for complete search history.

(56) References Cited

U.S. PATENT DOCUMENTS

| | | | | |
|---|---|---|---|---|
| 4,085,347 | A | * | 4/1978 | Lichius .................. 310/216.065 |
| 4,360,562 | A | * | 11/1982 | Endo et al. .................... 310/327 |
| 5,179,872 | A | * | 1/1993 | Pernice ......................... 310/153 |
| 5,930,071 | A | | 7/1999 | Back |
| 6,104,115 | A | | 8/2000 | Offringa et al. |
| 6,545,391 | B1 | * | 4/2003 | Su et al. ......................... 310/332 |
| 6,814,209 | B1 | * | 11/2004 | Acosta ............................ 310/83 |

(Continued)

FOREIGN PATENT DOCUMENTS

| | | | |
|---|---|---|---|
| JP | 09-200983 A1 | 7/1997 | |
| JP | 09200983 A * | 7/1997 | ............... H02K 1/27 |
| WO | 2008148402 A1 | 12/2008 | |

OTHER PUBLICATIONS

Machine translation of JP09-200983 (published: Jul. 1997, translated: Dec. 2012).*

*Primary Examiner* — Michael Andrews
(74) *Attorney, Agent, or Firm* — Ritchison Law Offices; John D Ritchison (57) ABSTRACT

A magnet rotor assembly comprises a magnet sleeve held on a rotor shaft by a rigid adhesive layer that includes at least one axial wedge shape corresponding to an axial irregularity on at least one of the surfaces bonded by the adhesive layer. Improved crush strength in the magnet sleeve and in other bonded metal parts, both initially and after exposure to high temperatures is accomplished by impregnating the parts with a curable resin.

14 Claims, 5 Drawing Sheets

(56) References Cited

U.S. PATENT DOCUMENTS

| | | |
|---|---|---|
| 2003/0076004 A1 | 4/2003 | Kusase |
| 2003/0193258 A1* | 10/2003 | Reiter et al. .................. 310/216 |
| 2007/0222326 A1* | 9/2007 | Ionel et al. .................... 310/216 |
| 2009/0001826 A1 | 1/2009 | Suzuki et al. |
| 2009/0010784 A1* | 1/2009 | Welker et al. .............. 417/423.7 |

* cited by examiner

Section B-B

MAGNET ROTOR ASSEMBLY INCLUDING A VACUUM IMPREGNATED BONDED MAGNET HAVING INCREASED CRUSH STRENGTH AT HIGH TEMPERATURES

CROSS-REFERENCE TO RELATED APPLICATIONS

This application claims the benefit of Provisional Patent Application Ser. No. 61/308,914 filed Feb. 27, 2010 by Stanley Byron Musselman et al and entitled "IMPROVED MAGNET ROTOR ASSEMBLY WITH INCREASED PHYSICAL STRENGTH".

STATEMENT REGARDING FEDERALLY SPONSORED RESEARCH OR DEVELOPMENT

None.

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates generally to the structure and manufacture of electric motors and, more specifically, to improved magnet rotor assemblies.

2. Background

Magnet rotors have gained acceptance in many applications including computer storage devices for media formats such as HOD, FDD, CD-ROM and DVD; automotive applications such as sensors, motors, power steering; office automation devices such as facsimile machines, copiers, scanners, and printers; and consumer electronics devices such as cameras and stereo components, hand-held power tools and the like. Neodymium-iron-boron (NdFeB) magnetic powders have emerged as a preferred magnet material for use in making magnet rotors for such applications. However, other useful materials for these applications include ferrite, samarium cobalt, AlNiCo and mixtures thereof. The selection of the particular magnetic materials used to form magnet rotors is often a function of such considerations as temperature, environment and other application conditions and on the desired performance of a magnet rotor under these conditions.

A magnet rotor can be made by injection molding techniques or can be assembled using compression molded, extruded, or sintered pre-formed magnets. When a magnet rotor is made using injection molding techniques, the magnet material is applied to a rotor shaft in a viscous, fluid state. Upon curing, the magnet material adheres to the rotor shaft. When a magnet rotor is made using a pre-formed magnet, a magnet sleeve is first shaped by, for example, compression molding, extruding or sintering. The magnet sleeve normally is positioned over the rotor shaft and fixed in place with an adhesive. In most such constructions the rotor shaft includes a core that has been press fit onto a shaft, thus increasing the diameter of the rotor shaft to meet specific requirements.

The magnetic properties of injection molded magnets are normally lower than those of compression molded magnets. Injection molded magnets typically contain about 65 to 70 volume percent magnet material compared to about 80% for typical compression molded, magnets resulting in a magnetic powder density of about 5.2 g/cm$^3$ in injection molded magnets and about 6.1 g/cm$^3$ in compression molded, magnets. This difference in magnetic density results in a remanence of 0.52 Tesla for magnet rotors made with injection molded magnets and of 0.68 Tesla for magnet rotors made with such pre-formed magnets. The energy product for magnet rotors made with such injection molded magnets is 51 kJ/cm$^3$ compared with 75 kJ/cm$^3$ for magnet rotors made with such pre-formed magnets.

Although magnet rotors made with pre-formed magnets have stronger magnetic properties and better torque delivery to the shaft, there have been drawbacks to their use in certain applications. It has been a problem that magnet rotors made with such pre-formed magnets tend to have an undesirably high failure rate when operated in a high frequency reciprocating mode, especially at high temperatures. It also is a problem that magnet rotors made using pre-formed magnets fixed to a shaft or core by an adhesive often exhibit an undesirably high run-out (0.3 to 0.4 mm) and noticeable cogging torque. It is thought that these drawbacks are related mainly to lack of uniformity in the thickness of the adhesive layer that bonds the pre-formed magnet to the rotor shaft. One typical adhesive material used to attach the pre-formed magnet sleeves to rotor shafts attains its maximum bonding strength at a thickness of about 5 to about 25 microns and exhibits weaker bonding when the adhesive layer is either thicker or thinner. (The thickness providing maximum bonding strength will, of course, vary from adhesive to adhesive.) Previously known manufacturing methods have not been able to mass produce magnet rotors in which pre-formed magnet sleeves are attached to rotor shafts with adhesive layers that are mostly at a desired uniform thickness to attain maximum adhesive strength for the particular adhesive used. As a result of the rotor shafts not being centered in the magnet sleeves the adhesive layers have thick and thin regions, both of which will result in weaker bonding. High frequency reciprocating operation of such prior art magnet rotors, especially at high temperatures, can cause early failure. Also, regions in the adhesive layer that are thicker than desired are known to result in higher run-out and cogging torque. In the past, it also has been a problem that during high temperature curing of an adhesive layer between a magnet sleeve and a rotor shaft, air bubbles from the porous magnet sleeve tend to enter the adhesive layer, resulting in areas of weaker bonding.

There is a need for:

A. improved magnet rotors that demonstrate reduced failure during high frequency reciprocating operation, especially at elevated temperatures.

B. There also is a need for improved magnet rotors that show reduced run-out during high speed operation.

C. Additionally there is a need for improved magnet rotors that demonstrate improved break-away torque and increased resistance to slippage during high frequency reciprocating operation.

D. There also is a need for improved magnet rotors having reduced cogging torque.

E. There is a need for a method for making magnet rotors that enables manufacturers to take advantage of the greater magnetic strength of pre-formed magnets.

F. Further, a need exists for an improved magnet rotor that retains its physical strength at high operating temperatures and a method for making such an improved magnet rotor.

G. Additionally there is a need for motors comprising such improved rotors.

BRIEF SUMMARY OF THE INVENTION

For this invention it is an object:
A. To fill these and other needs of the prior art.
B. To decrease the failure rate of magnet rotors, especially during high frequency reciprocating operation at elevated temperatures.
C. To decrease run-out in magnet rotors.
D. To result in the reduction of cogging torque in magnet rotors.
E. To have increased torque throughput in rotor assemblies also is an object of this invention.
F. To have magnet rotors and other bonded metal structures having improved crush strength.
G. To realize a retention of crush strength in magnet rotors and other bonded metal structures after high temperature operation.

These and other objects are achieved by the present invention, which, in one aspect, is an improved magnet rotor assembly comprising a rotor shaft and a pre-formed magnet sleeve attached to the rotor shaft by a rigid adhesive layer, the layer including at least one axial wedge region corresponding to at least one axial irregularity in at least one of the surface of the rotor shaft and the inner circumference of the pre-formed magnet sleeve. When the magnet sleeve is positioned over the rotor shaft the axial irregularity defines the adjacent space between the rotor shaft and the magnet sleeve such that cured adhesive in that space will be in the shape of a wedge that resists slippage of the rotor shaft and the magnet sleeve relative to each other. The axial irregularity may be of any useful shape that accomplishes the formation of at least one such axial wedge shaped region in the adhesive layer. For example, the axial surface irregularity may take the form of an axial raised bead or raised ridge along one of the surfaces. A preferred axial surface irregularity is an axial planar region on one of the surfaces. The planar region is preferred because it works with the arc of the opposing surface to define a bi-directional such wedge shape in the adhesive layer between the surfaces.

In another aspect the invention is such an improved magnet rotor assembly wherein the rigid adhesive layer includes at least three equidistant such axial wedge regions corresponding to at least three axial irregularities on the rotor shaft surface or on the inner circumference of the magnet sleeve, or on both, the axial wedge regions being substantially equidistant and being separated by regions of the adhesive layer having a substantially uniform thickness. The substantially equidistant axial irregularities have been found to center the rotor shaft in the magnet sleeve. As a result, the cured adhesive layer between the rotor shaft and the magnet sleeve will have a substantially uniform thickness between the wedge shaped regions. In a preferred embodiment the axial irregularities are all on either the surface of rotor shaft or on the inner surface of the magnet sleeve and are all axial planar regions.

In many embodiments of the present invention the rotor shaft includes at least one cylindrical core mounted on a shaft member. The core can add diameter to the rotor shaft to meet specific application requirements. Cores usually are made from magnetically responsive materials such as cast iron or machined steel. Useful cores also can be sintered metal parts made from powdered metals. In longer magnet lengths two cores may be used to further increase the retention of the magnet. Preferably in such embodiments the two cores are of an identical diameter and are press fit on a shaft member.

In a preferred embodiment the pre-shaped magnet sleeve is filled with a resin to give it added physical strength, to protect it against the weakening effects of oxidation and to avoid the introduction of air bubbles into the adhesive layer during high temperature curing. In yet another preferred embodiment the sleeve is e-coated on surfaces not in contact with the adhesive layer. E-coating of bonded metal magnets is known to protect such magnets from oxidation. However, typical e-coat materials can soften at the elevated temperatures encountered by many magnet rotors. In a preferred embodiment the pre-formed magnet sleeve is e-coated only on surfaces that will not be in contact with the adhesive layer. It has been observed that taking e-coatings out of the torque pathway improves torque through put to the shaft.

In still another aspect the invention includes a device, such as a motor, comprising such an improved magnet rotor assembly. In a further aspect the present invention comprises a method for making an improved magnet rotor assembly. The method includes the steps of (1) providing a rotor shaft and a pre-formed magnet sleeve for the rotor shaft wherein at least one of the inner circumference of the magnet sleeve and the outer circumference of the rotor shaft comprises at least one axial irregularity, (2) applying a curable adhesive to at least one of the rotor shaft or magnet sleeve, (3) positioning the magnet sleeve over the rotor shaft and (4) curing the adhesive to form a rigid layer connecting the magnet sleeve and the rotor shaft. The cured adhesive layer defines at least one axial wedge shape corresponding generally to the at least one axial irregularity.

In still another aspect the present invention comprises such a method for making an improved magnet rotor assembly wherein at least one of the rotor shaft and the pre-formed magnet sleeve comprise at least three substantially equidistant axial irregularities and the rigid adhesive layer defines corresponding wedge shapes separated by regions of rigid adhesive having a substantially uniform thickness. In this method the substantially equidistant axial irregularities cause the rotor shaft to self-center in the magnet sleeve. The preferred axial irregularities in this preferred embodiment are axial planar regions in the surface of one of the rotor shaft or the inner circumference of the sleeve resulting in bi-directional wedge shapes in the cured adhesive layer. In one embodiment of this method the rotor shaft comprises at least one cylindrical core mounted on a shaft member.

In another aspect the present invention is a novel method for increasing the crush strength of bonded metal parts, such as magnet sleeves, both initially and after exposure to high temperatures, the method including the steps of (1) providing a bonded metal part, (2) filling the bonded metal part with a curable resin and (3) curing the curable resin Pre-formed magnet shapes are known. Their manufacture in shapes suitable for use as magnet sleeves in the present invention also is known. Pre-formed magnet sleeves have been made by methods including sintering, ring extrusion and compression molding of magnet powders. Each such method is useful in making pre-formed magnet shapes useful in the present invention, although the making of such shapes is illustrated here by a brief description of the method of making such a shape by compression molding.

Compression molded bonded magnets are well known. Typically, such magnets are made from powdered magnetic materials. Generally speaking, the powdered magnetic material will be a compound that comprises rare earths, transition metals and boron. Magnetic materials include ferrites, samarium-cobalt, aluminum-nickel-cobalt, and neodymium-iron-boron type materials. In recent years neodymium-iron-boron has been used for many bonded magnet applications. Preferably the compounds will be made from Nd, Pr, Fe, Co and B. Industrial use of powders as a component in the manufacture of powdered metal magnets has centered around $Nd_2Fe_{14}B$ and its derivatives, such as $Dy_2Fe_{14}B$; $Dy_xNd_{2-x}Fe_{14}B$; $Pr_2Fe_{14}B$, and $Pr_xNd_{(2-x)}Fe_{14}B$. As is well known in the art, cobalt may be substituted for all or part of the iron in the neodymium-iron-boron phase of the magnet. Other metals such as niobium, titanium, zirconium, vanadium, tungsten etc can be added to neodymium-iron-boron alloys to obtain desired magnetic properties. Other rare earth metals, such as, but not limited to, cerium, dysprosium, erbium, praseodymium and yttrium may be substituted for all or part of the neodymium. Part or all of the boron may be replaced by carbon, silicon or phosphorous. Other metals or nonmetals may be substituted for small portions of either the iron or the neodymium, and the relative proportions of the neodymium, iron, and boron may be varied slightly. Usually, Nd—Fe—B material for use in such pre-formed magnets is obtained by the rapid solidification process. Other methods, such as using hydrogen, also can be used to make these magnetic materials.

The particle size of useful powdered materials varies widely depending on particular applications. Typically, powdered metals useful in making compression molded bonded magnets have an average particle size of about 150 microns, although particle sizes ranging from about 20 to about 400 microns may be useful. Magnetic metal particles useful in the present invention are commercially available, for example, from Neo Materials Technologies (Magnequench), Toronto, Ontario, Canada.

Such powders typically are mixed with curable resins to form B-stage powders that are at least partially coated with an uncured resin system. The resin system may be a phenol novolac resin and a diamine crosslinker or hardener as described in the co-pending, commonly assigned U.S. patent application U.S. Ser. No. 12/152,383 filed May 13, 2008. As taught in that application other hardener systems can be used with the phenol novolac resin depending on the application and the curing method. Illustrative examples of other useful hardeners for phenol novolac resins are amines, polyamides, anhydrides, phenolic resins, polymercaptans, isocyanates and dicyandiamides which are selected depending on the application and the curing method. The resin system also may be, for example, bisphenol A-epichlorohydrin or a bisphenol F-epichlorohydrin epoxy resin system for example. The resin system also can be a thermoplastic material.

B-stage powders normally are used to form powdered metal shapes by a well-known compression process in which high pressure is applied to a pre-measured charge of the powder held in a die cavity. The pressure applied typically is about 60 tons/square inch. The resulting shape, referred to at this point as a B-stage item, is then cured by heating at atmosphere to a temperature sufficient to initiate crosslinking. Typically the curing temperature is about 170 degrees C. and is maintained for less than an hour.

In preferred embodiments of the present invention the pre-formed magnet sleeve is filled with a curable resin. Filling the magnet sleeve with a curable resin, preferably using a vacuum process, has been found to avoid the undesirable transfer of air bubbles into the adhesive layer during curing. Bubbles in the adhesive layer result in weak spots that can lead to early failure of the magnet rotor assembly. Resin impregnation of the magnet sleeve prior to its adhesive bonding to the rotor shaft has been found to greatly reduce the incidence of air bubbles from the sleeve penetrating the adhesive layer during its curing.

It has been discovered that resin impregnation of the magnet sleeve also greatly increases the physical strength of the sleeve. The crush strength of a resin filled pre-formed magnet sleeve has been found to be about 35% greater after resin impregnation, even after exposure to temperatures as high as 160° C.

Impregnation of a magnet sleeve with a resin typically is accomplished by removing air from the magnet pores, filling the pores with the resin, removing excess resin from the magnet surface and curing the resin by heat or with the use of an activator. In the present invention good results have been obtained using a methacrylate anaerobic-curing resin system that results in a resin-filled pre-formed magnet sleeve that is useful in high temperature applications. Many other resin systems can be used for impregnation of the pre-formed magnet sleeves including phenol novolac resins, Bisphenol A modified phenol novolac epoxy resins, Bis A epoxy resins, hydrogenated Bis A epoxy resins, Bis F epoxy resins, dimmer acid modified epoxys, urethane resins, polyester resins and silicone resins. There are many resin possibilities that will perform well in the present invention and that are intended to be within the scope of the appended claims.

In a preferred embodiment the magnet sleeve will be e-coated with a resin layer to further protect against oxidation, at least on the surfaces of the magnet sleeve that are not intended to be in contact with the adhesive layer. (E-coating or electrocoating is a coating process involving an electrolyte containing material that is deposited on a substrate upon the application of a current.) Although it is possible to make a magnet rotor assembly within the scope of the invention in which the magnet sleeve is e-coated on its entire surface, the preferred embodiment is not e-coated on its inner circumference. E-coats are known to have a low glass transition temperature (Tg), softening at temperatures of 100° to 120° C. Avoiding placement of an e-coat in the torque pathway also avoids any reduction in torque throughput resulting from the softening of the e-coat at elevated temperatures. One notes that an e-coat can be added to a magnet sleeve whether or not the pre-formed magnet sleeve is resin filled.

A variety of materials are useful to form the cured adhesive layer bonding the rotor shaft to the pre-formed magnet sleeve. The adhesive material is selected to cause the magnet sleeve and the rotor shaft to perform as one structural unit, especially in high frequency reciprocating applications at elevated temperatures, such as in brushless DC electric motors. The adhesive must bond effectively to both the rotor shaft material and to the pre-formed magnet sleeve, whether or not the sleeve is resin filled, as described above. In preferred embodiments the adhesive will be required to bond to a magnet sleeve that is not e-coated on the surface that is in contact with the adhesive. The adhesive should develop high bond strength at thicknesses of between 5 and 25 microns, preferably between at thicknesses of between 10 and 20 microns.

Selection of a particular adhesive material will also depend on such end-use conditions as the ambient temperature range, which can affect the preferred glass transition temperature (Tg) of the cured adhesive, tensile strength throughout the range of typical use temperatures, hardness properties and thermal shock resistance. The selection of a particular adhesive material or system also can depend on the rotor shaft material which may be, for example, sintered iron, machined steel, a powdered metal component, or the like.

There are many adhesive systems that will provide rigid, cured, adhesive layers connecting the inner circumference of the magnet sleeve and the outer circumference of the rotor shaft. Good results have been obtained using a one-part aluminum filled, thixotropic Bisphenol A epoxy resin—amine hardener system.

Many other types of adhesive may be used to achieve the rigid adhesive layer depending on the final properties required of the rotor assembly. For example, useful resins include phenol novolac resins, Bisphenol A modified phenol novolac epoxy resins, Bis A epoxy resins, hydrogenated Bis A epoxy resins, Bis F epoxy resins and dimmer acid modified epoxys. These resins can be used in combination with a variety of hardeners including diamine, dicyandiamide, polyamide, dodeceny succinic anhydride, NMA, HHPA, TETA and MeHHPA. Other adhesive systems such as polyurethane and acrylic also can be used to form a rigid adhesive layer between the rotor shaft and the magnet sleeve, depending on the final product requirements. Magnet rotor assemblies comprising any such adhesive system are intended to be within the scope of the appended claims.

In a preferred method for making the magnet rotor assembly of the present invention, at least the inner surface of the magnet sleeve and, optionally, the surface of the rotor shaft are roughened prior to application of the adhesive. A variety of known methods for roughening surfaces can be used. For example, contacting the surface with an air stream filled with abrasive particles, such as aluminum oxide particles, can be used.

The rotor shaft may be made from any magnetically responsive material. In applications calling for a small diameter rotor shaft, the rotor shaft material is typically machined or forged steel. In applications calling for a larger diameter rotor shaft a cylindrical core typically is press fit onto a machined or forged shaft member. In such applications the core material is typically iron or a bonded metal shape formed from iron powder. The core material for larger diameter applications can include sintered powdered metal shapes, as well. At the present time, iron is the preferred material due to its strength, magnetic responsiveness, price and availability.

The axial irregularity can be on the inner circumferential surface of the magnet sleeve or on the surface of the rotor shaft. When there is a plurality of axial irregularities, they can all be on one of the surfaces or they can be located on both surfaces. However, providing axial irregularities on both surfaces is not a preferred embodiment because of the manufacturing complications added by such a construction. When, for example, there are three axial irregularities with one on the inner circumference of the magnet sleeve and two on the rotor shaft, care must be taken when assembling the rotor to orient the magnet sleeve on the rotor shaft such that the axial irregularities are substantially equidistant prior to curing the adhesive layer. However, correct assembly is substantially automatic when all the axial irregularities are on the same component. It is preferred at the present time that the axial irregularities are planar regions all on the inner surface of the magnet sleeve. Forming planar regions on the inner surface of the sleeve during compression molding is relatively easier than machining planar regions on the rotor shaft, and having all the planar regions on one surface avoids the need to use care in aligning the axial irregularities to make sure they are substantially equidistant. Most importantly, such a magnet sleeve is self-centering when it is mounted on a rotor shaft.

As described above some benefits of this invention are realized when a single axial irregularity on one of the mating surfaces of the rotor shaft and the magnet sleeve results in an axial wedge shape in the adhesive layer. The full benefits of the invention are realized when at least three substantially equidistant axial irregularities are formed on one of the surfaces, resulting in self-centering of the rotor shaft during manufacture, in the formation of corresponding wedge shapes in an adhesive layer that otherwise is of substantially uniform thickness, in reduced run-out and reduced cogging torque. In a preferred embodiment the axial irregularities are axial planar regions in one of the surfaces, which provide all of the above benefits plus bi-directional wedges for added stability in high frequency reciprocating applications.

The following list refers to the drawings:

TABLE B

Reference numbers.

| Ref # | Description |
|-------|-------------|
| 11 | Shaft |
| 12 | Core |
| 13 | Magnetic Material |
| 20 | Magnet Rotor Assembly |
| 21 | Rotor Shaft |
| 22 | Preformed Magnet Sleeve |
| 23 | Adhesive Layer |
| 24 | Equidistant Axial Planar |
| 25 | Bi Directional Wedge Shapes |
| 31 | Preformed Magnet Sleeve |
| 32 | Outer Cylindrical Surface |
| 33 | Inner Cylindrical Surface |
| 34 | Sleeve Ends |
| 35 | Sleeve Ends |
| 36 | Planar Irregularities |
| 40 | Magnet Rotor Assembly |
| 41 | Rotor Shaft |
| 42 | Core |
| 43 | Shaft |
| 44 | Pre Formed Magnet Sleeve |
| 45 | Equidistant Axial Planar |
| 46 | Rigid Adhesive Layer |
| 47 | Bi Directional Wedge Region |
| 48 | Openings |

DETAILED DESCRIPTION OF THE INVENTION

Figure 1:
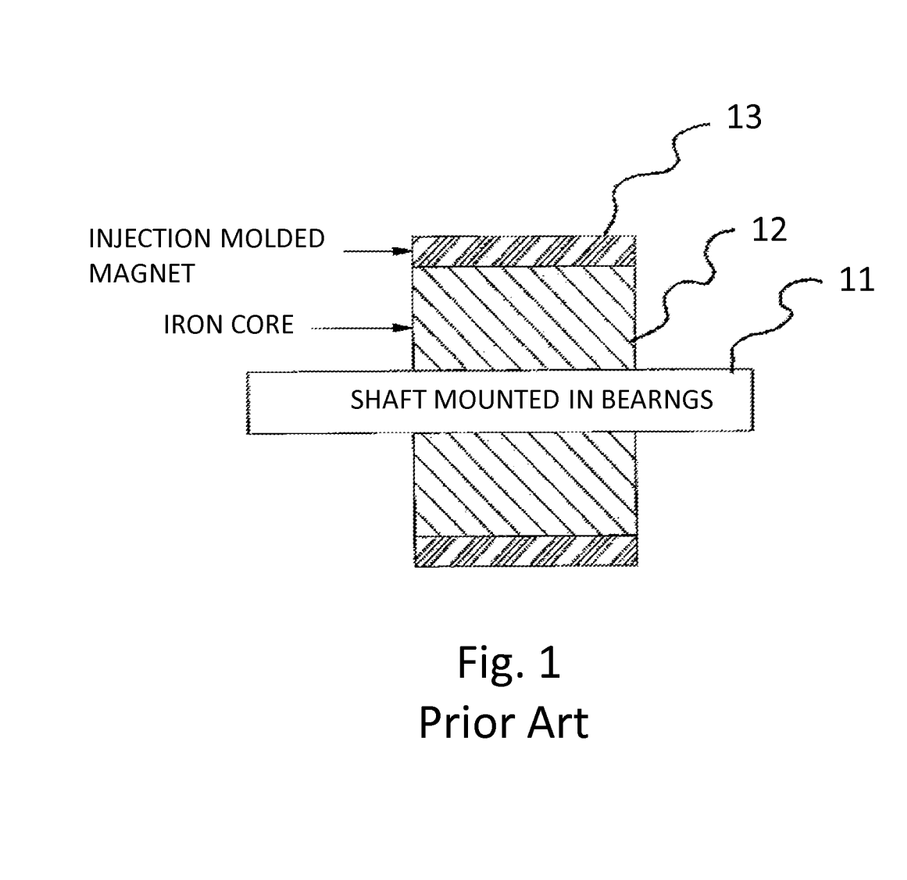
FIG. 1 shows an embodiment of the prior art in schematic cross section.

A prior art rotor assembly is shown in FIG. 1. Shaft 11 is mounted on bearings (not shown), and core 12 is mounted on shaft 11. During assembly core 12 is press fit on shaft 11. Typically, magnet material 13 is injection molded onto the core/shaft assembly. During injection molding magnet material 13 is in a viscous state and adheres to the core upon curing.

Figure 2:
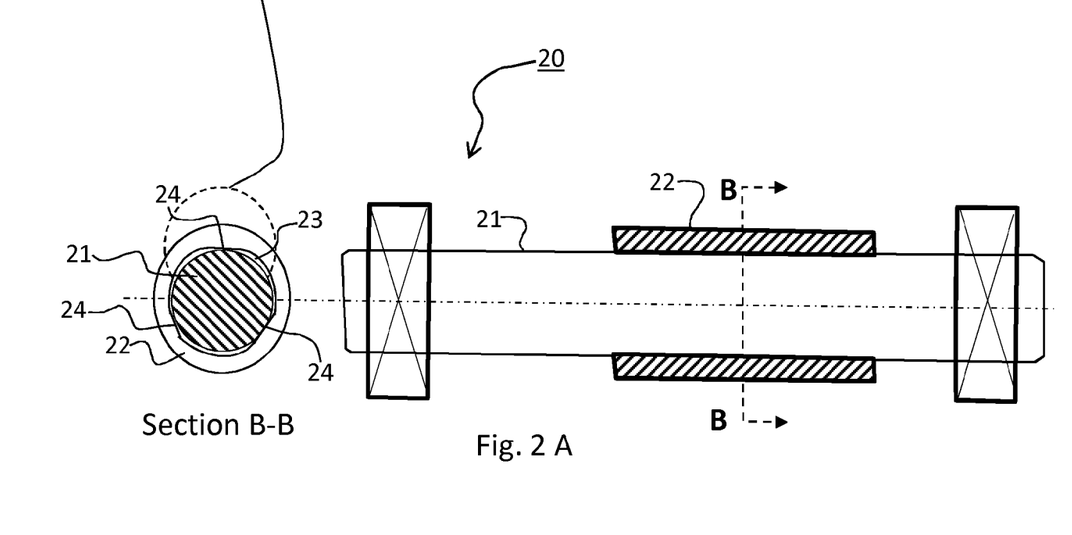
FIG. 2 shows an embodiment of the present invention in schematic cross section.

FIGS. 2a and 2b show magnet rotor assembly 20 in elevated cross section. Assembly 20 includes pre-formed magnet sleeve 22 mounted on rotor shaft 21 and held in place by adhesive layer 23. Rotor shaft 21 is centered in sleeve 22 by three, substantially equidistant axial planar regions 24 on the inner circumference of pre-formed magnetic sleeve 22. An enlarged view of one of the axial planar regions 24 is shown in enlarged cross section in FIG. 2b. Axial planar region 24 and rotor shaft 21 define bi-directional wedge shapes 25 in adhesive layer 23. Adhesive layer 23 has a substantially uniform thickness between wedge shapes 25 as a result of the centering effect of the three, substantially equidistant axial planar regions 24.

Figure 3:
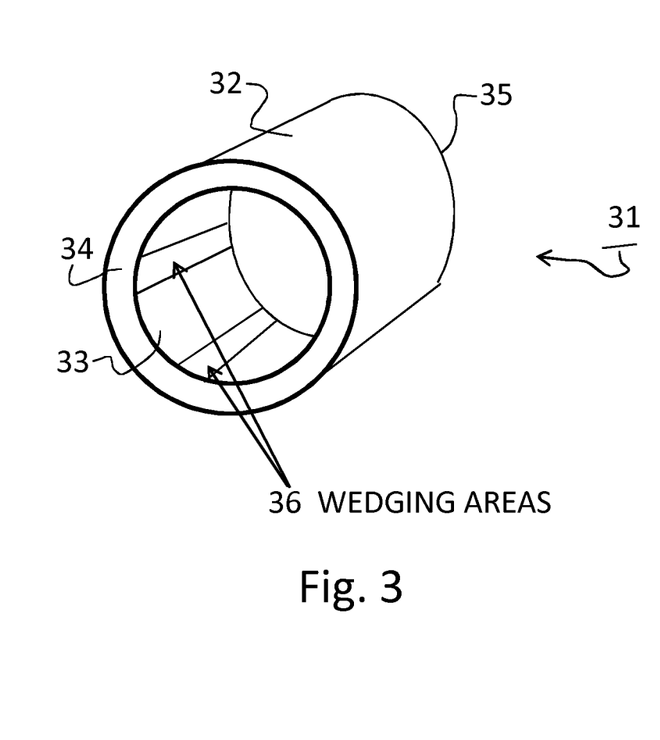
FIG. 3 shows a schematic perspective view of a magnet sleeve having axial irregularities comprising axial planar regions.

FIG. 3 shows pre-formed magnet sleeve 31 according to the present invention. Sleeve 31 can be compression molded, as described above, from a variety of available materials. Sleeve 31 also can be formed by extrusion or can be sintered. Sleeve 31 is generally cylindrical and includes an outer cylindrical surface 32 and an inner cylindrical surface 33. As described above, pre-formed magnet sleeve 31 may be resin filled. In a preferred embodiment outer cylindrical surface 32 and sleeve ends 34 and 35 are protected with an e-coat as described above. Inner cylindrical surface 33 is not protected by an e-coat in the preferred embodiment, thus removing the e-coat from the torque pathway when the magnet sleeve 31 is mounted onto a rotor shaft and fixed by a rigid adhesive layer.

Inner cylindrical surface 33, which otherwise defines a smooth cylindrical surface when viewed in cross-section is interrupted at regular intervals by planar irregularities 36. As described above, the invention includes embodiments in which there is a single axial irregularity. FIG. 3 shows an embodiment in which there are six axial irregularities, with two being visible in schematic perspective. The axial irregularities in FIG. 3 are axial planar regions 36. In preferred embodiments the axial irregularities are present in multiples of three and are substantially equidistant around the circumference of either the rotor shaft or the inside of the magnet sleeve. In FIG. 3, six planar regions 36 are at substantially equidistant locations on inner cylindrical surface 33, resulting in self-centering of a rotor shaft when the magnet sleeve 31 is mounted on the rotor shaft. Two of the six planar regions 36 are visible in the perspective view of FIG. 3.

Figure 4:
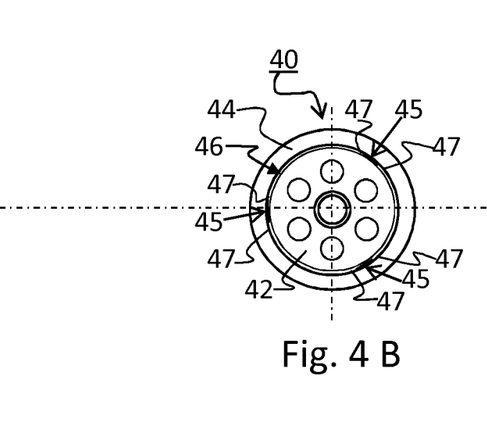
FIGS. 4a, 4b and 4c show in elevated and enlarged cross section a preferred embodiment of the present invention where the rotor shaft includes a core.

FIGS. 4a, 4b and 4c show an embodiment of a magnet rotor assembly, generally designated as 40, of the present invention in which the rotor shaft, generally designated as 41, comprises at least one core 42 on shaft 43. Core 42 can be any magnetically responsive material and is usually cast iron, machined steel, or a bonded metal piece that, optionally, may be sintered, as described above. Core 42 may be of solid construction or may include openings 48 to reduce its mass.

A rotor shaft 41 that includes a core such as core 42 is appropriate for applications in which a magnet rotor assembly 40 of greater diameter is appropriate, as described above.

Magnet rotor assembly 40 includes pre-formed magnet sleeve 44 that has three substantially equidistant axial planar regions 45 around its inner circumference. Magnet sleeve 44 is adhesively bonded to rotor shaft 41 by rigid adhesive layer 46 between magnet sleeve 44 and core 42. Axial planar regions 45 cooperate with the circumference of core 42 to cause rotor shaft 41 to be self centering when sleeve 44 is mounted on it during manufacture and to define bi-directional wedge regions 47 in rigid adhesive layer 46 upon curing as described above.

In the preferred embodiment shown in FIG. 4a, rotor shaft 41 comprises two cores 42 press fit onto shaft 43. A single magnet sleeve 44 is mounted over both cores 42.

Example 1

A magnet rotor assembly as shown in FIGS. 4a and 4b was made using a compression molded magnet sleeve having an e-coat on its surfaces not in contact with the adhesive layer. This magnet rotor assembly demonstrated the following magnetic properties: Br 0.68 Tesla and Energy Product 75 kJ/m3. A similar rotor was made by injection molding magnet material onto the rotor shaft. The injection molded magnet rotor assembly demonstrated the following properties: Br 0.52 Tesla, Energy Product 51 kJ/m3.

Both of the magnet rotor assemblies were tested for torque through put. The torque shown by the injection molded magnet was 2 oz in compared to 3.1 oz in for the rotor made according to the present invention. This example indicates that a magnet rotor assembly according to the present invention transmits torque to the shaft better than does the prior art injection molded magnet rotor assembly.

Example 2

Two types of magnet rotor assemblies were made as in Example 1 except that the magnetic properties of the magnet rotor assembly according to the present invention were adjusted to be the same as the magnetic properties of the injection molded magnet rotor assembly. The magnet rotor assembly according to the present invention was impregnated with an epoxy resin as described above and e-coated on its outer circumference and edges. The two magnet rotor assemblies were tested to determine the push-out force needed to separate the magnet material from the core on the rotor shaft. The push-out force needed to separate the injected molded magnet material from the core was 6.5 kN, and the push-out force needed to separate the magnet sleeve from the core in the magnet rotor assembly of the present invention was 34.8 kN. The test results in this Example indicate the present invention provides a magnet rotor assembly in which the components are more strongly bonded together and will act more as a single unit in the transmittal of torque to the shaft member than will the injection molded magnet rotor assembly.

Example 3

Magnet rotor assemblies were made as described in Example 2 and were heated at 150 C. for 96 hrs, cooled to room temperature and tested for changes in the push-out force necessary to separate the magnet material from the core resulting from heat exposure. The percentage loss in push-out force necessary to separate the magnet material from the core is 12.5% for the injection molded magnet rotor assembly and only 5.8% for the magnet rotor assembly according to the present invention, confirming that a magnet rotor assembly according to the present invention retains its structural integrity better than do injection molded magnet rotor assemblies following exposure to heat.

Example 4

Figure 5:
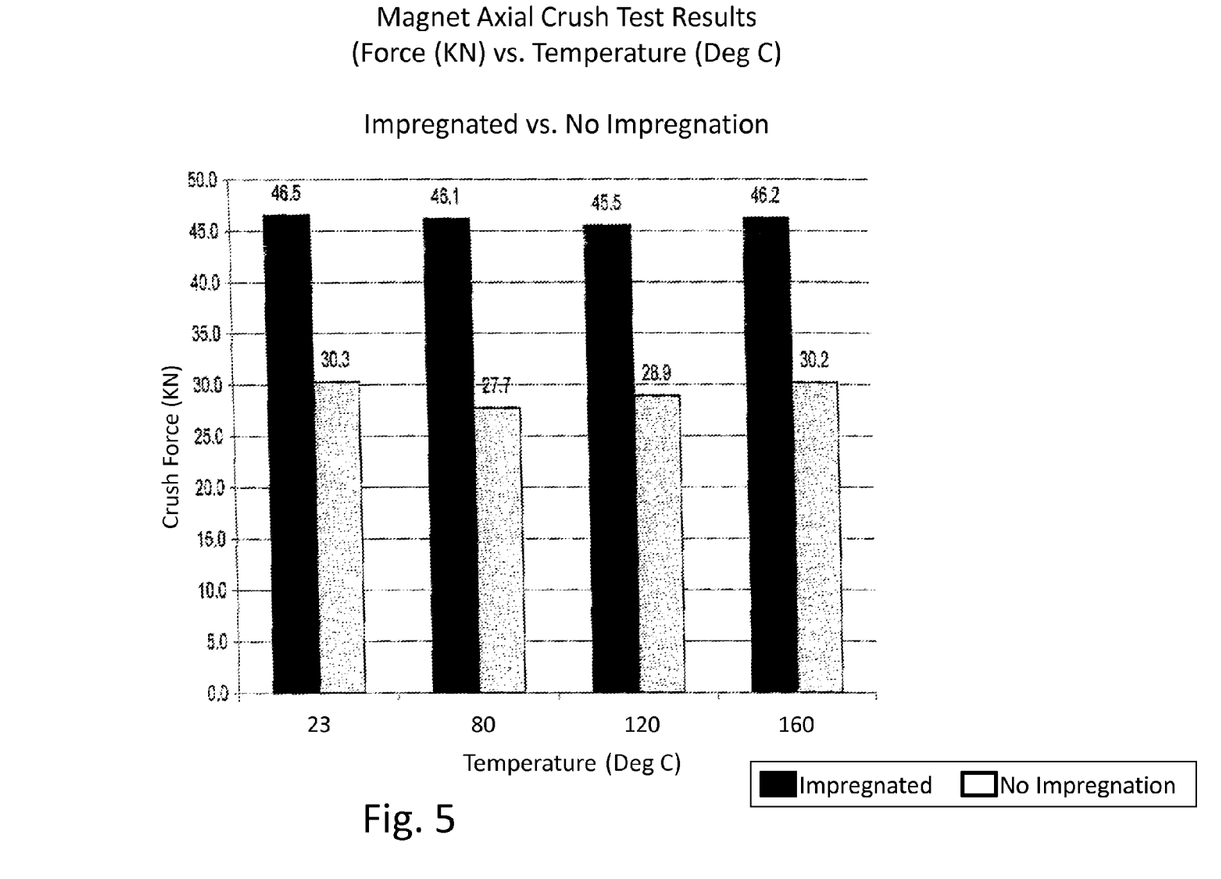
FIG. 5 is a graph showing the improved crush strength provided by resin impregnation of the magnet sleeve which is retained even after the application of heat.

Magnet sleeves suitable for use in the present invention were prepared, and the porosity in half of the sleeves was impregnated with a curable resin after vacuum evacuation of gasses. Six samples of both resin impregnated and non-resin impregnated magnet sleeves were subjected to elevated temperatures for two hours, cooled to room temperature and stressed until crushed. The combined results shown in FIG. 5 indicate that the resin impregnated magnet sleeves retain about 35% more crush strength than do non-impregnated magnet sleeves even after exposure to elevated temperatures as high as 160° C.

With the above description it is to be understood that the IMPROVED BONDED MAGNET ROTOR ASSEMBLY is not to be limited to only the disclosed embodiment. The features of the IMPROVED BONDED MAGNET ROTOR ASSEMBLY are intended to cover various modifications and equivalent arrangements included within the spirit and scope of the description.

The invention claimed is:

1. A bonded powdered metal magnet comprising:
   a. a bonded powdered metal magnet with pores and of a predetermined shape; and
   b. an anaerobically cured resin vacuum impregnated into the pores of the bonded powdered metal magnet
   wherein the resin remains in the pores and provides the bonded powdered metal magnet with improved crush strength at elevated temperatures.

2. The bonded powdered metal magnet of claim 1 wherein the bonded powdered metal magnet has pores and is of a predetermined shape comprises powdered ferrite, samarium-cobalt, neodymium-iron-boron, alnico or mixtures thereof and always includes the bonded powdered metal magnet with pores having a binding resin.

3. The bonded powdered metal magnet of claim 1 wherein the anaerobically cured resin is a methacrylate resin.

4. The bonded powdered metal magnet with pores of claim 1 having a pre-formed shape defining a cylindrical magnet sleeve.

5. A bonded powdered metal magnet with pores of claim 4 further comprising a rotor shaft mounted on the bonded powdered metal magnet
wherein the resulting device is a magnet rotor assembly.

6. The magnet rotor assembly of claim 5 additionally comprising a rigid adhesive layer comprising a one-part Bisphenol A epoxy resin/amine hardener system connecting the rotor shaft and the magnet sleeve, the adhesive layer comprising a reduced incidence of curing-induced air bubbles.

7. The magnet rotor assembly of claim 6 wherein at least one of the rotor shaft and the magnet sleeve comprise at least one axial irregularity adapted to define an axial wedge shape in the adhesive layer.

8. The magnet rotor assembly of claim 7 wherein a plurality of such axial irregularities are positioned so as to define a plurality of axial wedge shapes in the adhesive layer, the axial wedge shapes being separated by regions of adhesive having a substantially uniform thickness.

9. The magnet rotor assembly of claim 8 wherein the adhesive layer comprises a one-part aluminum-filled Bisphenol A epoxy resin/amine hardener system and the regions of substantially uniform thickness in the rigid adhesive layer have an average thickness of from about 5 to about 25 microns.

10. The magnet rotor assembly of claim 8 wherein the axial irregularities comprise axial planar regions and wherein the wedge shapes in the adhesive layer are bidirectional.

11. The magnet rotor assembly of claim 7 wherein the magnet sleeve comprises a pre-formed compression bonded magnet, a pre-formed extruded powdered or a pre-formed sintered magnet.

12. The magnet rotor assembly of claim 11 wherein the surfaces of the pre-formed magnet sleeve which are not in contact with the adhesive layer are e-coated.

13. The magnet rotor assembly of claim 7 wherein the rotor shaft comprises at least one magnetically responsive core member mounted on a central shaft.

14. The magnet rotor assembly of claim 7 wherein at least one of the outer circumference of the rotor shaft and the inner circumference of the bonded magnet cylindrical sleeve is roughened.

* * * * *